United States Patent
Lin et al.

(10) Patent No.: US 11,205,956 B2
(45) Date of Patent: Dec. 21, 2021

(54) POWER CONVERTER WITH COMMON DC POWER SOURCE AND POWER SUPPLY APPARATUS HAVING THE SAME

(71) Applicant: DELTA ELECTRONICS, INC., Taoyuan (TW)

(72) Inventors: Hung-Chieh Lin, Taoyuan (TW); Chao-Li Kao, Taoyuan (TW); Yi-Ping Hsieh, Taoyuan (TW); Jin-Zhong Huang, Taoyuan (TW); Po-Hsin Tseng, Taoyuan (TW); Chih-Hsien Li, Taoyuan (TW); Hung-Yu Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 85 days.

(21) Appl. No.: 16/267,881

(22) Filed: Feb. 5, 2019

(65) Prior Publication Data
US 2020/0195138 A1 Jun. 18, 2020

(30) Foreign Application Priority Data
Dec. 13, 2018 (CN) .......................... 201811525082.6

(51) Int. Cl.
*H02M 3/155* (2006.01)
*H02M 7/537* (2006.01)

(52) U.S. Cl.
CPC ........... *H02M 3/155* (2013.01); *H02M 7/537* (2013.01)

(58) Field of Classification Search
CPC .............................. H02M 3/155; H02M 7/537

USPC ............................................................ 307/52
See application file for complete search history.

(56) References Cited

U.S. PATENT DOCUMENTS

| 2003/0128558 A1 | 7/2003 | Takahashi et al. |
| 2015/0214783 A1 | 7/2015 | Lo Torto et al. |

FOREIGN PATENT DOCUMENTS

| CN | 101001051 A | 7/2007 |
| CN | 108809094 A | 11/2018 |
| WO | WO-03/058791 A2 | 7/2003 |
| WO | WO-2015/111019 A1 | 7/2015 |

OTHER PUBLICATIONS

Translation of Chinese patent CN108809094 (A) to Cao, Lei, Nov. 13, 2018, retrieved Dec. 21, 2020, 14 pages. (Year: 2018).*
Office Action dated Jul. 10, 2019 in TW Application No. 107144991.
Chinese Office Action cited in counterpart application No. 201811525082.6 dated Nov. 3, 2020, 7 pages.

* cited by examiner

*Primary Examiner* — Hal Kaplan
(74) *Attorney, Agent, or Firm* — Muncy, Geissler, Olds & Lowe, P.C.

(57) ABSTRACT

A power converter with a common DC power source includes a DC power source and at least two power modules. Each of the power modules is coupled with each other and coupled to the DC power source. Each of the power module includes a coupled inductive component coupled to the DC power source, a DC output conversion unit coupled to the coupled inductive component, and a capacitor group having a coupling point. By using the coupled inductive component, it is to solve the problem of return current between the power modules caused by coupling multiple coupling points to each other.

12 Claims, 5 Drawing Sheets

POWER CONVERTER WITH COMMON DC POWER SOURCE AND POWER SUPPLY APPARATUS HAVING THE SAME

BACKGROUND

Technical Field

The present disclosure relates to a power converter and a power supply apparatus, in particular to a power converter with a common DC power source and a power supply apparatus having the same.

Description of Related Art

The statements in this section merely provide background information related to the present disclosure and do not necessarily constitute prior art.

The uninterruptible power system (UPS) is used to continuously supply AC or DC power to load devices such as electrical appliances during abnormalities or power outages of the power grid to maintain the normal operation of electrical appliances. Under general circumstances, uninterruptible power supply devices are used to uninterruptedly power supply to critical commercial equipment or precision instruments such as computers and servers, thereby preventing data loss, communication interruption, or loss of control of the device. In actual use, based on the consideration of improving power supply reliability or demand power, two or more than two sets of UPSs may be coupled in parallel to form a dual-machine or multi-machine UPS architecture. Furthermore, in order to save the occupied volume of the rechargeable battery, such as a storage battery, two or more than two UPSs may commonly use a single rechargeable battery as a backup power source.

For the DC output stage (DC output converter), based on the requirements of high output voltage and withstand voltage, two capacitors may be connected in series (at the coupling point) to provide the DC output in the dual bus manner. A plurality of DC output converters implements the operation of parallel power supply by jointly connecting the coupling points. Due to the common connection of the coupling points, in the case of a common DC power source, a return path of current between different DC output converters will be formed. That is, part of the input current may flow through one set of DC output converters to another set of DC output converters, thereby causing another set of DC output converter to overcurrent due to the unexpected return current.

In order to suppress the return current between different DC output converters, inductance components could be added to independently control the current flowing through each inductance components, or switching components could be added and controlled to disconnect the unwanted return path. Although the return current between different DC output converters may be suppressed by the added inductance components or the switching components, the added inductance components and/or switching components and corresponding control circuits not only increase the cost but also increase the complexity and difficulty of the circuit control.

Therefore, how to design a power converter with a common DC power source and power supply apparatus having the same to solve the technical problems above is an important subject studied by the inventors and proposed in the present disclosure.

SUMMARY

The objective of the present disclosure is to provide a power converter with a common DC power source, it may solve the problem of return current between different DC output converters caused by coupling multiple coupling points to each other.

In order to achieve the objective, the power converter with the common DC power source of the present disclosure includes a DC power source and at least two power modules coupled to the DC power source. Each of the power modules is coupled to each other, and each of the power modules includes a coupled inductive component coupled to the DC power source, a DC output conversion unit coupled to the coupled inductive component, and a capacitor group coupled to the DC output conversion unit. The capacitor group has two capacitors coupled in series and a coupling point is between the two capacitors. The at least two power modules are coupled to each other through the coupling points.

Therefore, the power converter with the common DC power source may solve the problem of return current between the power modules caused by coupling multiple coupling points to each other, thereby reducing the circuit cost and simplifying the complexity and difficulty of the circuit control.

Another object of the present disclosure is to provide a power supply device, it may solve the problem of return current between different DC output converters caused by coupling multiple coupling points to each other.

In order to achieve the foregoing objective, the power supply device of the present disclosure is applied to power supply to a load, and the power supply device includes the power converter with the common DC power source as foregoing and at least two DC input conversion units. Each of the DC input conversion units has an input end and an output end, the input end is correspondingly coupled to each of the DC output conversion units and each of the capacitor groups, and the output end is coupled to the load.

Therefore, the power converter with the common DC power source may solve the problem of return current between the power modules caused by coupling multiple coupling points to each other, thereby reducing the circuit cost and simplifying the complexity and difficulty of the circuit control.

DETAILED DESCRIPTION

The embodiments of the present disclosure are described by way of specific examples, and those skilled in the art may readily appreciate the other advantages and functions of the present disclosure. The present disclosure may be embodied or applied in various other specific embodiments, and various modifications and changes may be made without departing from the spirit and scope of the present disclosure. It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure. The technical content and detailed description of the present disclosure will be described below in conjunction with the drawings.

Figure 1:
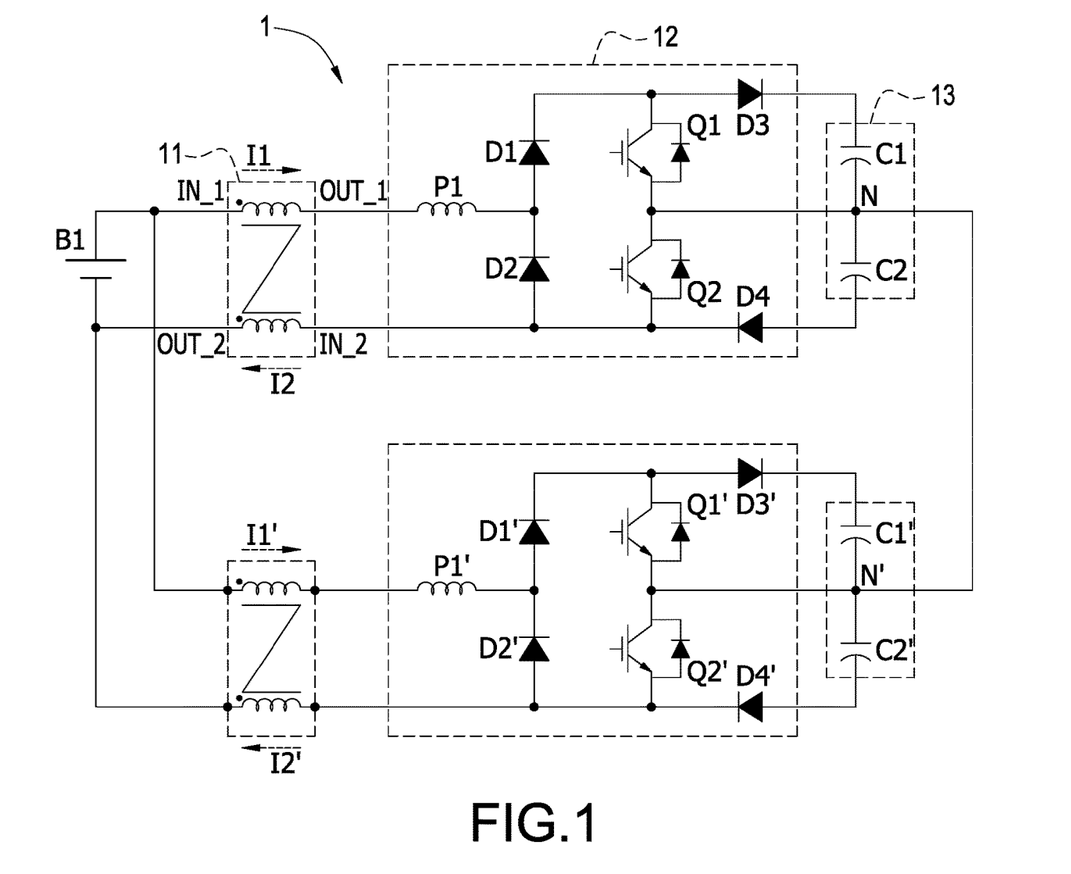
FIG. 1 is a circuit diagram of an embodiment of a power converter with a common DC power source according to the present disclosure.
Figure 3:
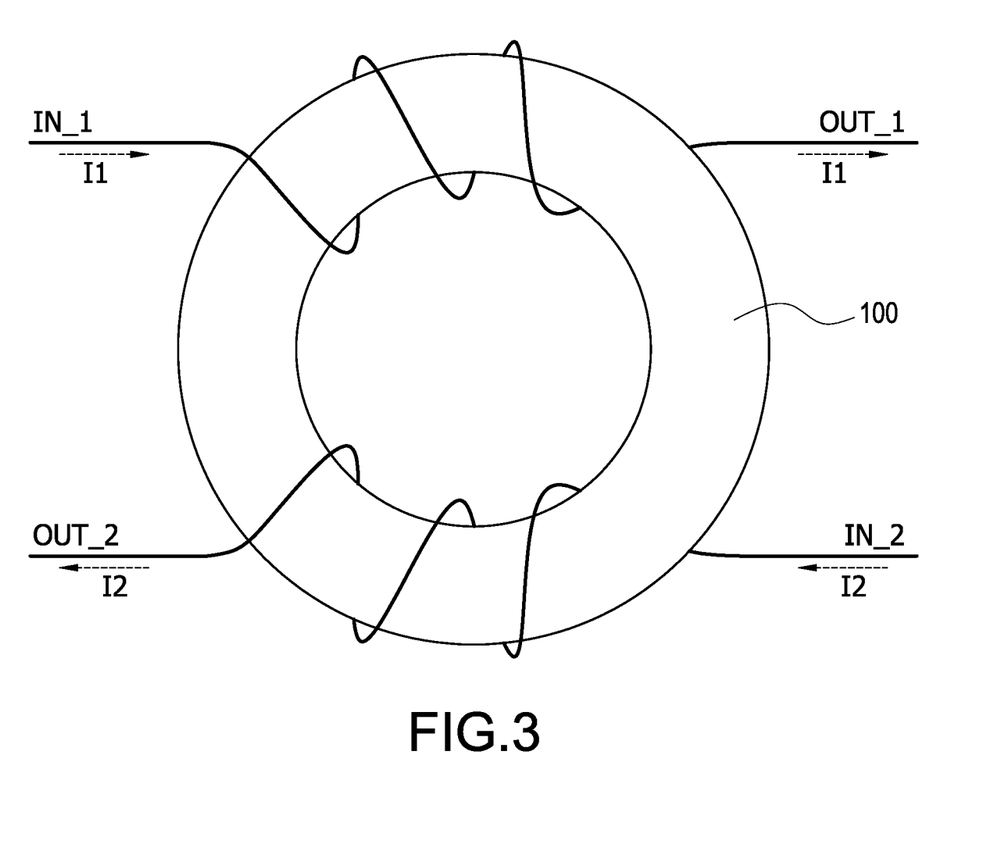
FIG. 3 is a schematic diagram of a coupled inductive component of the power converter with the common DC power source according to the present disclosure.

Referring to FIG. 1 and FIG. 3, FIG. 1 is a circuit diagram of an embodiment of a power converter with a common DC power source according to the present disclosure, and FIG. 3 is a schematic diagram of a coupled inductive component of the power converter with the common DC power source according to the present disclosure.

In the embodiment of the power converter with the common DC power source of the present disclosure includes a DC power source B1 and at least two power modules 1. In the embodiment of the present disclosure, there are two power modules 1. The two power modules 1 are coupled to the DC power source B1. Each of the power modules 1 is coupled to each other and includes a coupled inductive component 11, a DC output conversion unit 12, and a capacitor group 13.

Further, the coupled inductive component 11 is coupled to the DC power source B1, and a first current I1 flows into the coupled inductive component 11 and a second current I2 returns to the DC power source B1. The DC output conversion unit 12 is coupled to the coupled inductive component 11, the DC output conversion unit 12 receives the first current I1, and the second current I2 returns to the DC power source B1 through the DC output conversion unit 12. The capacitor group 13 is coupled to the DC output conversion unit 12. The capacitor group 13 has two capacitors coupled in series (C1, C2 as shown in FIG. 1), and the two capacitors are a first capacitor C1 and a second capacitor C2, respectively. There is a coupling point N between the first capacitor C1 and the second capacitor C2, that is, the first capacitor C1 and the second capacitor C2 are coupled to the coupling point N, and the coupling point N may be used to connect a neutral line of an AC power system. Each of the power modules 1 is coupled to each other through the coupling point N. In this embodiment, there are two coupling points N. The first current I1 flowing out of the DC power source B1 and the second current I2 returning to the DC power source B1 are the same in magnitude. In the embodiment of the present disclosure, the DC power source B1 may be a lithium battery or a lead-acid battery, but the present disclosure is not limited thereto.

Further, as shown in FIG. 1 and FIG. 3, the coupled inductive component 11 includes a first input end IN_1, a second input end IN_2, a first output end OUT_1, and a second output end OUT_2. The first input end IN_1 and the second output end OUT_2 are respectively coupled to the DC power source B1, and the first output end OUT_1 and the second input end IN_2 are respectively coupled to the DC output conversion unit 12. The first input end IN_1 and the second output end OUT_2 have the same polarity, and therefore there are two black dots on left side of the coupled inductive component 11 as shown in FIG. 1. The second input end IN_2 and the first output end OUT_1 have the same polarity, and therefore there is no black dot on right side of the coupled inductive component 11 as shown in FIG. 1. The first current I1 flows into the coupled inductive component 11 through the first input end IN_1, and flows out of the coupled inductive component 11 through the first output end OUT_1 and further flows to the DC output conversion unit 12. The second current I2 flows into the coupled inductive component 11 through the second input end IN_2, and flows out of the coupled inductive component 11 through the second output end OUT_2, and further flows to the DC power source B1 to form a current loop. As described above, the first current I1 flowing into the first input end IN_1 of the coupled inductive component 11 is identical to the second current I2 flowing out of the second output end OUT_2 of the coupled inductive component 11 by using the coupled inductive component 11. Therefore, the first current I1 or the second current I2 won't flow to the other power modules 1 through the coupling point N. Therefore, it may solve the problem of return current between the power modules due to the coupling points N coupled to each other, thereby preventing the power modules being damaged from overcurrent.

As shown in FIG. 3, in the embodiment of the present disclosure, the coupled inductive component 11 is a common mode choke coil, or referred to as a common mode choke. The coupled inductive component 11 has an iron core 100 and two coils arranged oppositely and wound in the opposite direction. The first input end IN_1 and the first output end OUT_1 are the same coil, and the second input end IN_2 and the second output end OUT_2 are the same coil.

In detail, the first input end IN_1 of the coupled inductive component 11 is coupled to a positive polarity of the DC power source B1, and each power module 1 is coupled to each other through the first input end IN_1. The second output end OUT_2 is coupled to a negative polarity of the DC power source B1, and each power module 1 is coupled to each other through the second output end OUT_2. In addition, the DC output conversion unit 12 is further coupled to an AC power source (no shown). Therefore, the DC power source B1 or the AC power source may be switched to couple to each of the DC output conversion units 12. For example, a switch is used and controlled to switch the DC power source B1 or the AC power source to couple to the DC output conversion unit 12, and the DC output conversion unit 12 converts the DC power source B1 or the AC power source into a DC output power source to uninterruptedly supply power to the load. In the embodiment of the present disclosure, the DC output conversion unit 12 converts the DC input power or the AC input power to provide a DC power output. Therefore, the DC output conversion unit 12 can be controlled as a DC-to-DC converter, which receives the DC input power and converts it to the DC output power, or can be controlled as an AC-to-DC converter, which receives the AC input power and converts it to the DC output power.

As shown in FIG. 1, the DC output conversion unit 12 includes an input inductor P1, a first diode D1, a second diode D2, a third diode D3, a fourth diode D4, a first power switch Q1, and a second power switch Q2. The input inductor P1 is coupled to the first output end OUT_1 of the coupled inductive component 11. The first diode D1 is coupled to the second diode D2 at a first common contact to form a first branch, wherein one end of the input inductor P1 is coupled to the first common contact. The second power switch Q2 is coupled to the first power switch Q1 at a second common contact to form a second branch, wherein the second branch is coupled in parallel with the first branch, and the second common contact is coupled to the coupling point N. The third diode D3 is coupled to the first diode D1 and the first power switch Q1. The fourth diode D4 is coupled to the second diode D2 and the second power switch Q2. The second diode D2, the second power switch Q2, and the fourth diode D4 are coupled to the second input end IN_2 of the coupled inductive component 11. The third diode D3 is coupled between the first diode D1, the first power switch Q1 and the first capacitor C1 of the capacitor group 13. The fourth diode D4 is coupled between the second diode D2, the second power switch Q2 and the second capacitor C2 of the capacitor group 13. The first power switch Q1 and the second power switch Q2 may be, for example but not limited to, one of a metal-oxide-semiconductor field-effect transistor (MOSFET), a bipolar junction transistor (BJT), and an insulated gate bipolar transistor (IGBT). The DC output conversion unit 12 of the embodiment of the present disclosure is only one possible circuit. However, the present disclosure is not limited thereto. It should be understood that other conversion circuits having the coupling point N between the two capacitors are applicable to the present for those skilled in the art.

Figure 2:
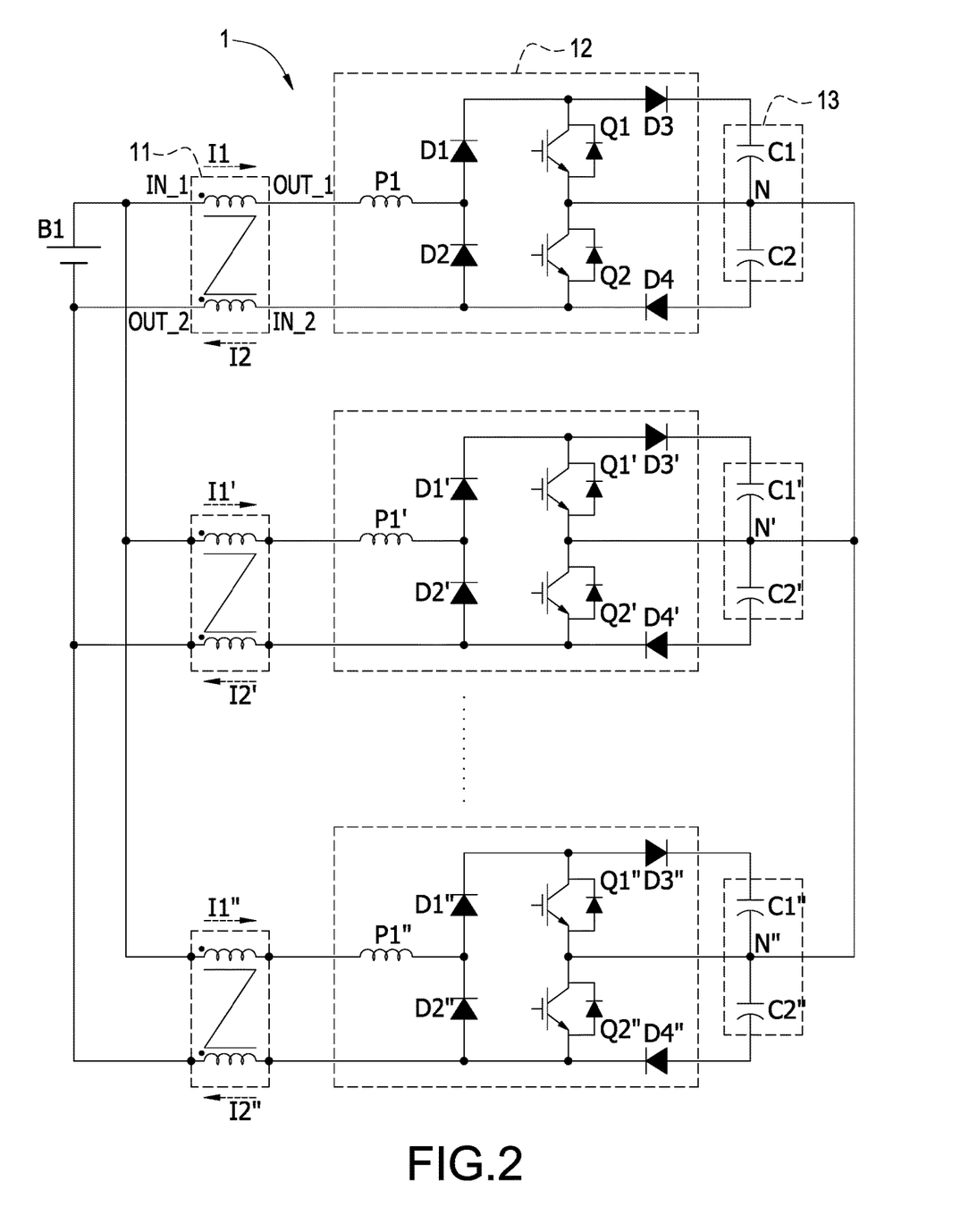
FIG. 2 is a circuit diagram of another embodiment of the power converter with the common DC power source according to the present disclosure.

Referring to FIG. 2, which is a circuit diagram of another embodiment of the power converter with the common DC power source according to the present disclosure, this embodiment is substantially identical to the embodiment shown in FIG. 1. The major difference is that more than two power modules 1 are shown in FIG. 2. Further, I1, I1' and I1" can be the same or similar circuit configurations. I2, I2' and I2" can be the same or similar circuit configurations. P1, P1' and P1" can be the same or similar circuit configurations. D1, D1' and D1" can be the same or similar circuit configurations. D2, D2' and D2" can be the same or similar circuit configurations. D3, D3' and D3" can be the same or similar circuit configurations. D4, D4' and D4" can be the same or similar circuit configurations. C1, C1' and C1" can be the same or similar circuit configurations. C2, C2' and C2" can be the same or similar circuit configurations. Q1, Q1' and Q1" can be the same or similar circuit configurations. Q2, Q2' and Q2" can be the same or similar circuit configurations. N, N' and N" can be the same or similar circuit configurations.

Figure 4:
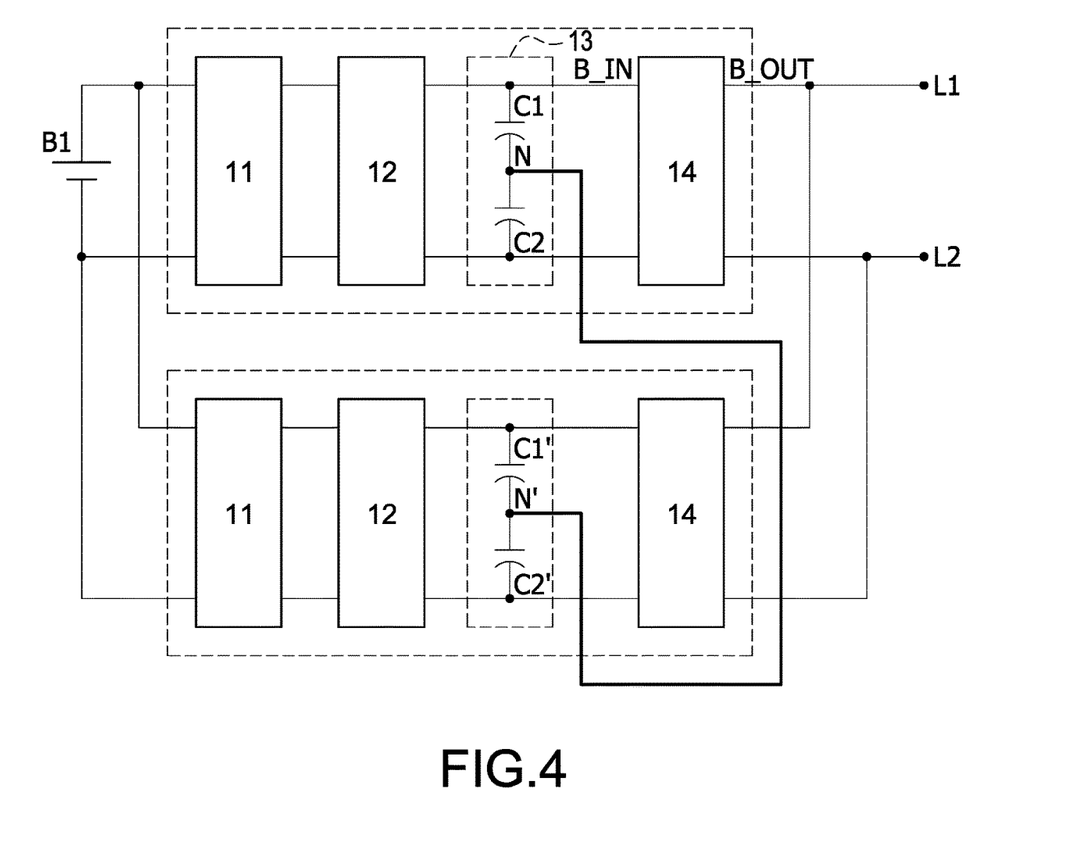
FIG. 4 is a block circuit diagram of a first embodiment of the power converter with the common DC power source applied to an uninterruptible power supply device according to the present disclosure.
Figure 5:
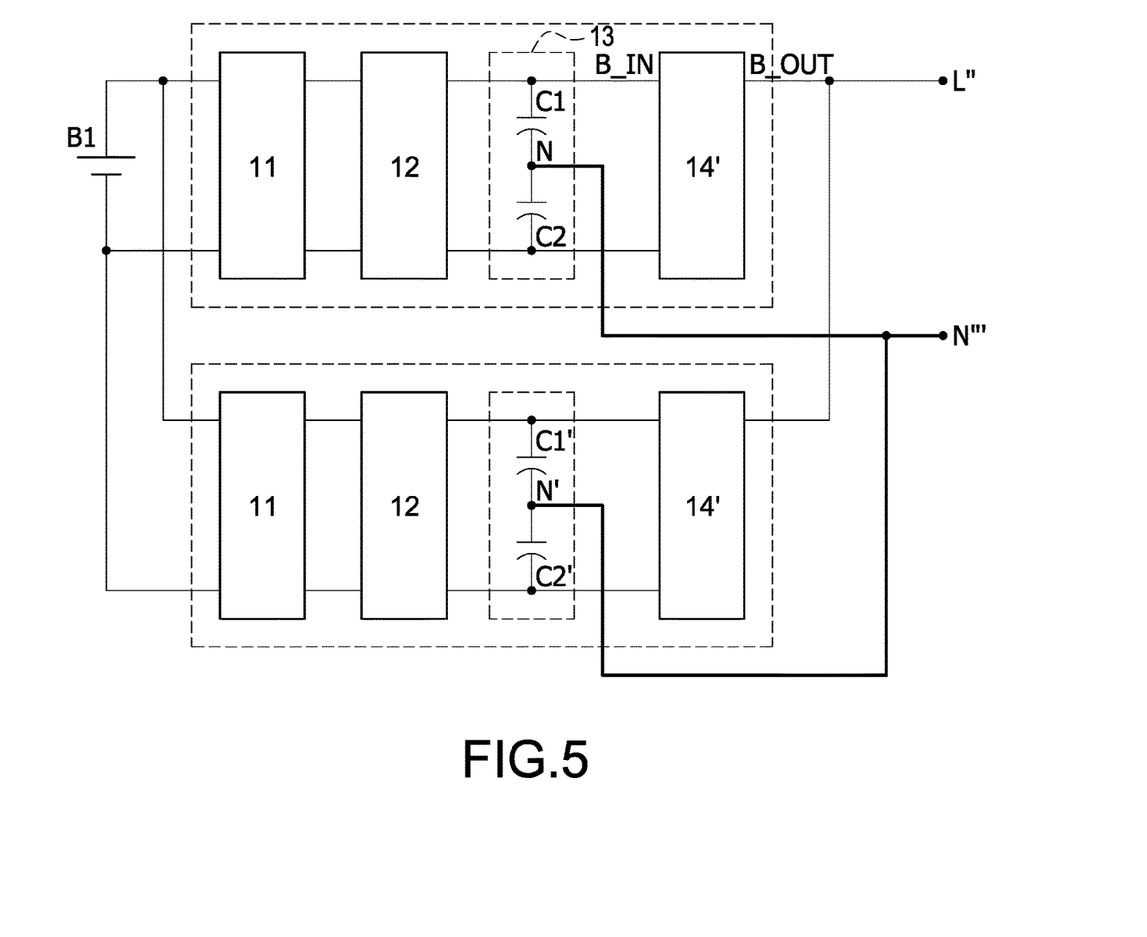
FIG. 5 is a block circuit diagram of a second embodiment of the power converter with the common DC power source applied to the uninterruptible power supply device according to the present disclosure.

Referring to FIG. 4 and FIG. 5, FIG. 4 is a block circuit diagram of a first embodiment of the power converter with the common DC power source applied to an uninterruptible power supply device according to the present disclosure, FIG. 5 is a block circuit diagram of a second embodiment of the power converter with the common DC power source applied to the uninterruptible power supply device according to the present disclosure.

As shown in FIG. 4, a first embodiment of the power supply device of the present disclosure is applied to uninterruptedly supply power to a load (not shown), including the power converter with the common DC power source (including the DC power source B1 and the at least two power modules 1) and at least two DC input conversion units 14 as described above. Each of the DC output conversion units 12 is coupled to the DC power source B1 5 through the coupled inductor component 11, and each of the DC output conversion units 12 may be also coupled to the AC power source (not shown) through a switch device. One end, such as a live wire of the AC power source may be coupled between the coupled inductive component 11 and the DC output conversion unit 12, and the other end, such as a neutral wire of the AC power source is coupled to the coupling point N. Each of the DC input conversion 10 units 14 has an input end B_IN and an output end B_OUT. The input end B_IN is coupled to the DC output conversion unit 12 and the capacitor group 13. The output end B_OUT is coupled to the load. In the present disclosure, each of the DC input conversion units 14 is coupled to each of the coupled inductive components 11, each of the DC output conversion units 12, and each of the capacitor groups 13 to form a power conversion module, and the 15 power conversion modules are connected in parallel with each other.

If the AC power source is normal, a controller controls to switch the AC power source to be coupled to the DC output conversion unit 12, so that the AC power source is converted by the DC output conversion unit 12 and the DC input conversion unit 14 to supply power to the load. On the contrary, if the AC power source is abnormal, the controller controls the DC power source B1 to be coupled to the DC output conversion unit 12 through the coupled inductive component 11, so that the DC power source B1 is converted by the DC output conversion unit 12 and the DC input conversion unit 14 to supply power to the load.

As shown in FIG. 4, if the load is a DC load, the DC input conversion unit 14 is a DC-to-DC converter for receiving the DC power source provided by the capacitor group 13, and converting the DC power source into a DC output power source to supply power to the DC load. Each of the DC input conversion units 14 provides a first power output end L1 and a second power output end L2 to couple to the load, and a polarity of the first power output end L1 is different from that of the second power output end L2 (for example, one is a positive polarity, and the other is a negative polarity), and each of the DC input conversion units 14 is coupled to each other through the first power output end L1 and the second power output end L2 to achieve an output parallel connection. The coupling connection between the coupling points N and N' is independent of the first power output end L1 and the second power output end L2.

If the AC power source is normal, the AC power source supplies power to the load through the DC output conversion unit 12, the capacitor group 13, the DC input conversion 10 unit 14, the first power output end L1 and the second power output end L2. If the AC power source is abnormal, the DC power source B1 uninterruptedly supplies power to the load through each power module 1 (including the coupled inductive component 11, the DC output conversion unit 12, and the capacitor group 13), the DC input conversion unit 14, and the first power output end L1 and the second power output end L2.

As shown in FIG. 5, if the load is an AC load, the DC input conversion unit 14' may be a DC-to-AC converter for receiving the DC power source provided by the capacitor group 13, and converting the DC power source into an AC output power source to supply power to the AC load. In this embodiment, the coupling point N of the capacitor group 13 is coupled to a neutral line end N'" of the AC load. Each of the DC input conversion units 14' provides a live line output end L", and each of the DC input conversion units 14' is coupled to each other through the live line output end L" to achieve an output parallel connection. The coupling points N, N' of the respective power modules 1 are coupled to the neutral line end N'" of the AC load. The DC input conversion unit 14' of this embodiment may be a conventional half-bridge inverter, which is not intended to limit the present disclosure.

If the AC power source is normal, the AC power source supplies power to the load through the DC output conversion unit 12, the capacitor group 13, the DC input conversion unit 14', the live line output end L" and the neutral line end N'". If the AC power source is abnormal, the DC power source B1 uninterruptedly supply power to the load through each power module 1 (including the coupled inductive component 11, the DC output conversion unit 12 and the capacitor group 13), the DC input conversion unit 14', the live line output end L" and neutral line end N".

In summary, the present disclosure has the following features and advantages: by using a coupled inductive component (for example, a common mode choke) that is a simple circuit component, it may solve the problem of return current between the power modules due to the commonly coupling of the coupling points, thereby reducing the circuit cost and simplifying the complexity and difficulty of the circuit control.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. A power converter with a common DC power source comprising:
   a DC power source, and
   at least two power modules coupled to the DC power source; each of the power modules is coupled to each other, and each of the power modules comprising:
   a coupled inductive component coupled to the DC power source,
   a DC output conversion unit coupled to the coupled inductive component, and the DC output conversion unit comprising an input inductor, and
   a capacitor group coupled to the DC output conversion unit, the capacitor group having two capacitors coupled in series and a coupling point is between the two capacitors,
   wherein the at least two power modules are coupled to each other through the coupling points, and
   wherein the coupled inductive component comprises a first input end, a second input end, a first output end, and a second output end; the first input end and the second output end are respectively coupled to the DC power source, the first output end and the second input end are respectively coupled to the DC output conversion unit, wherein a polarity of the first input end is identical to that of the second output end, and a polarity of the second input end is identical to that of the first output end.

2. The power converter with the common DC power source in claim 1, wherein each of the first input ends is coupled to a positive polarity of the DC power source, and each of the second output ends is coupled to a negative polarity of the DC power source.

3. The power converter with the common DC power source in claim 2, wherein a current flowing into the first input end is equal to a current flowing out of the second output end.

4. The power converter with the common DC power source in claim 1, wherein the coupled inductive component is a common mode choke.

5. The power converter with the common DC power source in claim 1, wherein each of the DC output conversion units comprises:
   a first diode and a second diode, the second diode and the first diode are coupled at a first common contact to form a first branch, wherein one end of the input inductor is coupled to the first common contact,
   a first power switch and a second power switch, the second power switch and the first power switch are coupled at a second common contact to form a second branch, wherein the second branch is coupled in parallel to the first branch,
   a third diode coupled to the first diode and the first power switch, and
   a fourth diode is coupled to the second diode and the second power switch.

6. The power converter with the common DC power source in claim 5, wherein the other end of the input inductor is coupled to the first output end of the coupled inductive component; the second diode, the second power switch, and the fourth diode are coupled to the second input end of the coupled inductive component; the second common contact is coupled to the coupling point; the third diode is coupled between the first power switch and the capacitor group; the fourth diode is coupled between the second power switch and the capacitor group.

7. The power converter with the common DC power source in claim 1, wherein the DC power source is one of a lithium battery and a lead-acid battery.

8. A power supply apparatus for supplying power to a load, comprising:
   a power converter with a common DC power source comprising:
   a DC power source,
   at least two power modules coupled to the DC power source; each of the power modules is coupled to each other, and each of the power modules comprising:
      a coupled inductive component coupled to the DC power source;
      a DC output conversion unit coupled to the coupled inductive component, and the DC output conversion unit comprising an input inductor; and
      a capacitor group coupled to the DC output conversion unit, the capacitor group having two capacitors coupled in series and a coupling point is between the two capacitors,
   wherein the at least two power modules are coupled to each other through the coupling points; and
   at least two DC input conversion units, each of the DC input conversion units has an input end and an output end, the input end is correspondingly coupled to each of the DC output conversion units and each of the capacitor groups, and the output end is coupled to the load,
   wherein the coupled inductive component comprises a first input end, a second input end, a first output end, and a second output end; the first input end and the second output end are respectively coupled to the DC power source, the first output end and the second input end are respectively coupled to the DC output conversion unit, wherein a polarity of the first input end is identical to that of the second output end, and a polarity of the second input end is identical to that of the first output end.

9. The power supply apparatus in claim 8, wherein each of the DC input conversion units is correspondingly coupled to each of the coupled inductive components, each of the DC output conversion units and each of the capacitor groups to form a power conversion module, and each of the power conversion modules is coupled in parallel with each other.

10. The power supply apparatus in claim 8, wherein each of the DC input conversion units is a DC-to-AC converter.

11. The power supply apparatus in claim 10, wherein each of the coupling points is coupled to a neutral line end of the load.

12. The power supply apparatus in claim 8, wherein each of the DC input conversion units is a DC-to-DC converter.

* * * * *